Patented July 17, 1934

1,966,650

UNITED STATES PATENT OFFICE 1,966,650

RUBBER COMPOSITION AND PRESERVATION OF RUBBER

Robert L. Sibley, Nitro, W. Va., assignor to The Rubber Service Laboratories Company, Akron, Ohio, a corporation of Ohio No Drawing. Application November 7, 1932, Serial No. 641,617

18 Claims. (Cl. 18—50)

The present invention relates to the art of rubber manufacture, and particularly relates to the preparation of rubber compositions which resist deterioration due to aging or to exposure to the atmosphere. It has long been known that such deterioration can be greatly retarded by treating the rubber either before or after vulcanization with certain substances known as age-resistors or antioxidants. The chief object of this invention then is to provide a new and superior class of antioxidants for rubber.

The age resisting characteristics of a vulcanized rubber product can be readily ascertained by subjecting samples of the vulcanized product in a bomb to the action of oxygen under pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the conditions of the test. In all the tests hereinafter set forth, the aging was carried out at a temperature of 70° C. and an oxygen pressure of 300 pounds per square inch.

According to the present invention, a new class of antioxidants or age-resisters has been found which, upon incorporating into a rubber stock imparts exceptional age resisting qualities to the vulcanized rubber product. The compounds herein disclosed as imparting such antioxidant characteristics to vulcanized rubber comprise the reaction product of a sulfur halide and a tertiary amine.

For example, the following reaction products are typical members of the class of age-resisters outlined above: reaction product of dimethyl aniline and sulfur dichloride, reaction product of diethyl aniline and sulfur monochloride, reaction product of phenonaphthacridine and sulfur monochloride, reaction product of dimethyl aniline and sulfur monochloride, reaction product of dimethyl alpha naphthylamine and sulfur dichloride, reaction product of dimethyl-o-toluidine and sulfur dichloride, reaction product of diethyl beta naphthylamine and sulfur dichloride, reaction product of acridine and sulfur dichloride, reaction product of phenyl acridine and sulfur dichloride, reaction product of nitroso phenyl beta naphthylamine and sulfur dichloride, reaction product of aldol alpha naphthylamine and sulfur monochloride, and analogous materials.

Any one or a mixture of the above-enumerated substances or of these substances with other antioxidants may be incorporated into rubber with good effect on its age resisting properties.

The following are to be understood as illustrative embodiments of the invention and not limitative of the scope thereof.

Example I 61 parts of dimethyl aniline (one-half a molecular proportion) were dissolved in substantially 240 parts by weight of a suitable solvent, for example carbon tetrachloride and the solution thereof cooled to substantially 0 to 10° C. To the solution thereby produced there was added slowly 28 parts of sulfur dichloride (substantially one-fourth a molecular proportion) dissolved in a small amount of carbon tetrachloride at a temperature of substantially 25 to 40° C. On completion of the reaction the solvent was removed preferably by distillation, and the neutralized residue steam distilled to remove any unreacted dimethyl aniline. The reaction product remaining after the steam distillation process, comprising the crude thiodimethyl aniline was purified by recrystallization from a solvent, for example benzene. The product obtained as described comprising a solid melting at 119–121° C., was incorporated in a rubber tread stock comprising—

| | Parts of |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1.0 |
| The reaction product of dimethyl aniline and sulfur dichloride | 1.0 |

The rubber stock thus compounded was vulcanized in the well known manner and portions of the vulcanized product were then artificially aged by heating in a bomb for 39 hours at a temperature of 70° C. and under a pressure of 300 pounds of oxygen per square inch. A comparison between the aged and unaged rubber product is given in Table I.

Table I

| Cure | | | Modulus of elasticity in lbs/in² at elongations of— | | Tensile at break in lbs/in² | Ultimate elong. % |
|---|---|---|---|---|---|---|
| Mins. | Lbs. steam pressure | Hours aged | 300% | 500% | | |
| 30 | 40 | 0 | 756 | 1980 | 2865 | 630 |
| 30 | 40 | 39 | 880 | ------ | 1650 | 460 |
| 60 | 40 | 0 | 1233 | 2905 | 3740 | 590 |
| 60 | 40 | 39 | 1235 | ------ | 2215 | 490 |
| 90 | 40 | 0 | 1333 | 3205 | 3850 | 570 |
| 90 | 40 | 39 | 1290 | ------ | 2100 | 430 |

The results set forth in Table I show that the preferred class of materials comprise an important group of antioxidants, as it is well known that the above stock employing diphenyl guanidine as an accelerator without an antioxidant possesses poor aging qualities.

*Example II*

The reaction product of substantially two molecular proportions of diethyl aniline and substantially one molecular proportion of sulfur monochloride was prepared in a manner analogous to that given in Example I. The reaction product comprising a dark brown resin was incorporated in a tread stock comprising—

|  | Parts of |
|---|---|
| Smoked sheet rubber | 100 |
| Carbon black | 50 |
| Zinc oxide | 5 |
| Sulfur | 3 |
| Pine tar | 2 |
| Stearic acid | 3 |
| The reaction product of benzoyl chloride and the sodium salt of mercaptobenzothiazole | 0.8 |
| Diphenyl guanidine | 0.2 |
| The reaction product of diethyl aniline and sulfur monochloride | 1.0 |

The rubber stock thus compounded was vulcanized and portions of the cured rubber stock aged in the oxygen bomb. The test data obtained on the aged and unaged vulcanized rubber stocks follow in Table II.

Table II

| Cure | | | Modulus of elasticity in lbs/in² at elongations of— | | Tensile at break in lbs/in² | Ultimate elong. % |
|---|---|---|---|---|---|---|
| Mins. | Lbs. steam pressure | Hours aged | 300% | 500% | | |
| 60 | 30 | 0 | 2120 | 4050 | 4570 | 560 |
| 60 | 30 | 48 | 1560 | ------ | 2440 | 490 |
| 75 | 30 | 0 | 2275 | 4280 | 4580 | 520 |
| 75 | 30 | 48 | 1645 | ------ | 2360 | 420 |
| 90 | 30 | 0 | 2270 | 4315 | 4315 | 500 |
| 90 | 30 | 48 | 1625 | ------ | 2100 | 400 |

*Example III*

The reaction product of substantially two molecular proportions of phenonaphthacridine and substantially one molecular proportion of sulfur monochloride was prepared in a manner analogous to that employed in preparing Example I. The product obtained comprising a resin was compounded in a tread stock identical with that employed in Example II with the exception that the reaction product of sulfur monochloride and phenonaphthacridine was employed as the antioxidant. The compounded rubber stock was cured and the cured rubber product aged in the oxygen bomb. A comparison between the modulus and tensile characteristics of the aged and unaged vulcanized rubber stock follow in Table III.

Table III

| Cure | | | Modulus of elasticity in lbs/in² at elongations of— | | Tensile at break in lbs/in² | Ultimate elong. % |
|---|---|---|---|---|---|---|
| Mins. | Lbs. steam pressure | Hours aged | 300% | 500% | | |
| 60 | 30 | 0 | 2350 | 4400 | 4600 | 520 |
| 60 | 30 | 48 | 1925 | ------ | 3050 | 485 |
| 75 | 30 | 0 | 2510 | 4475 | 4475 | 500 |
| 75 | 30 | 48 | 2000 | ------ | 2930 | 460 |
| 90 | 30 | 0 | 2485 | 4530 | 4530 | 500 |
| 90 | 30 | 48 | 1980 | ------ | 2855 | 440 |

*Example IV*

The reaction product of substantially two molecular proportions of dimethyl aniline and substantially one molecular proportion of sulfur monochloride was prepared in a manner analogous to that used in preparing Example I. The product obtained comprising a resin was incorporated in a tread stock identical with that employed in Example II with the exception that the reaction product of dimethyl aniline and sulfur monochloride was employed as antioxidant. A comparison between the tensile and modulus characteristics of the aged and unaged vulcanized rubber stocks follow in Table IV.

Table IV

| Cure | | | Modulus of elasticity in lbs/in² at elongations of— | | Tensile at break in lbs/in² | Ultimate elong. % |
|---|---|---|---|---|---|---|
| Mins. | Lbs. steam pressure | Hours aged | 300% | 500% | | |
| 60 | 30 | 0 | 2355 | ------ | 4340 | 480 |
| 60 | 30 | 48 | 1795 | ------ | 2480 | 420 |
| 75 | 30 | 0 | 2550 | ------ | 3935 | 430 |
| 75 | 30 | 48 | 1720 | ------ | 1810 | 305 |
| 90 | 30 | 0 | 2630 | ------ | 3890 | 425 |
| 90 | 30 | 48 | 2060 | ------ | 2590 | 390 |

*Example V*

The reaction product of substantially two molecular proportions of dimethyl alpha naphthylamine and substantially one molecular proportion of sulfur dichloride was prepared in a manner analogous to that employed for the preparation of thio dimethyl aniline hereinbefore set forth. The product thus produced was incorporated in the typical tread stock set forth in Example II with the exception that the present material was employed as antioxidant. The tensile data obtained by testing the aged and unaged vulcanized rubber stocks are given in Table V.

Table V

| Cure | | | Modulus of elasticity in lbs/in² at elongations of— | | Tensile at break in lbs/in² | Ultimate elong. % |
|---|---|---|---|---|---|---|
| Mins. | Lbs. steam pressure | Hours aged | 300% | 500% | | |
| 60 | 30 | 0  | 1960 | 4030 | 4400 | 540 |
| 60 | 30 | 48 | 1635 |      | 2280 | 440 |
| 75 | 30 | 0  | 2065 | 4310 | 4420 | 520 |
| 75 | 30 | 48 | 1690 |      | 2440 | 440 |
| 90 | 30 | 0  | 2330 | 4370 | 4370 | 500 |
| 90 | 30 | 48 | 1700 |      | 2265 | 410 |

Example VI

The reaction product of substantially two molecular proportions of dimethyl-o-toluidine and substantially one molecular proportion of sulfur dichloride was also prepared in a manner similar to that by which thio dimethyl aniline hereinbefore set forth in Example I was prepared. The product thus obtained was incorporated in the typical rubber tread stock hereinbefore set forth under Example II with the exception that the reaction product of dimethyl-o-toluidine and sulfur dichloride was employed as the antioxidant. The test data showing the modulus and tensile characteristics of the aged and unaged cured rubber product are given in Table VI.

Table VI

| Cure | | | Modulus of elasticity in lbs/in² at elongations of— | | Tensile at break in lbs/in² | Ultimate elong. % |
|---|---|---|---|---|---|---|
| Mins. | Lbs. steam pressure | Hours aged | 300% | 500% | | |
| 60 | 30 | 0  | 1860 | 3865 | 4510 | 585 |
| 60 | 30 | 48 | 1630 |      | 2750 | 495 |
| 75 | 30 | 0  | 2100 |      | 4140 | 495 |
| 75 | 30 | 48 | 1790 |      | 2460 | 410 |
| 90 | 30 | 0  | 2185 |      | 4300 | 495 |
| 90 | 30 | 48 | 1670 |      | 2325 | 420 |

From the specific examples hereinbefore set forth, it is shown that rubber compositions containing small proportions of the preferred class of materials markedly resist the deterioration influences due to heat and oxidation. Furthermore, tests carried out in which the preferred class of materials was incorporated in the typical tread stocks hereinbefore set forth have shown such vulcanized rubber stocks to be greatly resistant to tear and cracking when portions thereof have been repeatedly and alternately stretched and the tension removed.

Obviously, practice of the present invention is not limited to the specific compositions given above, such compositions being merely illustrative of the manner of employing the antioxidants or age-resistors of this invention. The antioxidants or age-resisters may be employed in conjunction with other vulcanizing agents than those specifically disclosed, for this invention is applicable generally to pure rubber or rubber compositions of the most varied nature.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a reaction product obtainable by reacting a sulfur halide and a tertiary amine having at least one aromatic substituent.

2. The method of preserving rubber which comprises treating rubber with a reaction product obtainable by reacting a sulfur halide and an aromatic tertiary amine.

3. The method of preserving rubber which comprises treating rubber with a reaction product obtainable by reacting a sulfur chloride and an aliphatic-aromatic tertiary amine.

4. The method of preserving rubber which comprises treating rubber with a reaction product obtainable by reacting a sulfur chloride and a tertiary amine, wherein the nitrogen atom of said amine is attached to two alkyl radicals and one aryl radical.

5. The method of preserving rubber which comprises treating rubber with a reaction product obtainable by reacting sulfur dichloride and a tertiary amine, wherein the nitrogen atom of said amine is attached to two alkyl radicals and one aryl radical.

6. The method of preserving rubber which comprises treating rubber with a reaction product obtainable by reacting substantially two molecular proportions of phenonaphthacridine and substantially one molecular proportion of sulfur monochloride.

7. The method of preserving rubber which comprises treating rubber with a reaction product obtainable by reacting substantially two molecular proportions of dimethyl-o-toluidine and substantially one molecular proportion of sulfur dichloride.

8. The method of preserving rubber which comprises treating rubber with thio dimethyl aniline.

9. A composition comprising rubber and a reaction product obtainable by reacting a sulfur halide and a tertiary amine having at least one aromatic substituent.

10. A composition comprising rubber and a reaction product obtainable by reacting a sulfur halide and an aromatic tertiary amine.

11. A composition comprising rubber and a reaction product obtainable by reacting a sulfur chloride and an aliphatic-aromatic tertiary amine.

12. A composition comprising rubber and a reaction product obtainable by reacting a sulfur chloride and a tertiary amine, wherein the nitrogen atom of said amine is attached to two alkyl radicals and one aryl radical.

13. A composition comprising rubber and a reaction product obtainable by reacting a sulfur dichloride and a tertiary amine, wherein the nitrogen atom of said amine is attached to two alkyl radicals and one aryl radical.

14. A composition comprising rubber and a reaction product obtainable by reacting substantially two molecular proportions of phenonaphthacridine and substantially one molecular proportion of sulfur monochloride.

15. A composition comprising rubber and a reaction product obtainable by reacting substantially two molecular proportions of dimethyl-o-toluidine and substantially one molecular proportion of sulfur dichloride.

16. A composition comprising rubber and thio dimethylaniline.

17. The vulcanized rubber product prepared by heating rubber and sulfur in the presence of a reaction product obtainable by reacting a sulfur halide and a tertiary amine having at least one aromatic substituent.

18. The vulcanized rubber product prepared by heating rubber and sulfur in the presence of a reaction product obtainable by reacting a sulfur halide and an aromatic tertiary amine.

ROBERT L. SIBLEY.